(12) United States Patent
Fourre et al.

(10) Patent No.: US 7,912,250 B2
(45) Date of Patent: Mar. 22, 2011

(54) DEVICE FOR ACQUIRING IMAGES OF PATTERNS FORMED BY FURROWS IN THE SKIN OF FINGERS OR THE PALM OF THE HAND

(75) Inventors: Joël-Yann Fourre, Louveciennes (FR);
Sylvaine Picard, Asnieres (FR);
François Rieul, Saint-Germain en Laye (FR); Jean-Christophe Fondeur, Alexandria, VA (US)

(73) Assignee: MORPHO, Paris (FR)

( * ) Notice: Subject to any disclaimer, the term of this patent is extended or adjusted under 35 U.S.C. 154(b) by 585 days.

(21) Appl. No.: 12/103,416

(22) Filed: Apr. 15, 2008

(65) Prior Publication Data
US 2009/0208070 A1 Aug. 20, 2009

(30) Foreign Application Priority Data
Feb. 14, 2008 (FR) ..................................... 08 00802

(51) Int. Cl.
*G06K 9/00* (2006.01)
(52) U.S. Cl. .......................................... 382/115; 396/14
(58) Field of Classification Search .................. 382/115, 382/119–132; 396/14–15
See application file for complete search history.

(56) References Cited

U.S. PATENT DOCUMENTS

| | | | | |
|---|---|---|---|---|
| 3,648,240 A * | 3/1972 | Jacoby et al. ................. | 382/115 |
| 4,032,889 A * | 6/1977 | Nassimbene ................. | 382/115 |
| 4,206,441 A * | 6/1980 | Kondo .......................... | 382/115 |
| 5,305,122 A * | 4/1994 | Hayashi et al. ............... | 358/530 |
| 5,483,601 A * | 1/1996 | Faulkner ....................... | 382/115 |
| 5,528,355 A * | 6/1996 | Maase et al. .................... | 356/71 |
| 5,596,454 A * | 1/1997 | Hebert ........................... | 359/726 |
| 5,825,924 A * | 10/1998 | Kobayashi ..................... | 382/219 |
| 6,731,778 B1 * | 5/2004 | Oda et al. ...................... | 382/118 |
| 7,181,052 B2 * | 2/2007 | Fujieda .......................... | 382/124 |
| 7,218,761 B2 * | 5/2007 | McClurg et al. ............... | 382/127 |
| 7,392,939 B2 * | 7/2008 | Hauke et al. ................... | 235/380 |
| 7,660,442 B2 * | 2/2010 | Sweeney et al. ............... | 382/115 |

(Continued)

FOREIGN PATENT DOCUMENTS

DE 10 2004 053927 A1 3/2006

(Continued)

*Primary Examiner* — Manav Seth
(74) *Attorney, Agent, or Firm* — Muncy, Geissler, Olds & Lowe, PLLC

(57) ABSTRACT

A device for acquiring images of a print of at least a portion of a user's hand, the device comprising a stand defining an acquisition zone extending substantially in a plane, an optical acquisition member that is fastened to the stand to have a field of view covering the acquisition zone, and a processor unit connected to the acquisition member to process an image signal coming therefrom, wherein:

the stand is arranged to provide an empty space zone containing the acquisition zone and forming a passage for said portion of the hand while moving parallel to the plane;

the device includes at least one projector member for projecting a light test pattern of at least two colors into the acquisition zone;

the optical acquisition member has a depth of field extending on either side of the acquisition zone and it possesses a color sensor having an acquisition speed that is sufficient to capture at least one color image of said portion of the hand moving at a predetermined maximum speed of movement; and the processor unit is arranged to extract from the color image signal a monochrome image in each of the projected colors, to reconstitute a texture of said portion of the hand from at least one of the monochrome images, and to reconstitute a shape from at least one of the monochromic images.

16 Claims, 1 Drawing Sheet

U.S. PATENT DOCUMENTS

| | | | | |
|---|---|---|---|---|
| 7,710,391 B2 * | 5/2010 | Bell et al. | | 345/156 |
| 7,756,327 B2 * | 7/2010 | Komiya et al. | | 382/162 |
| 2006/0023919 A1 * | 2/2006 | Okamura et al. | | 382/115 |
| 2006/0078170 A1 * | 4/2006 | Kamata et al. | | 382/115 |
| 2007/0274574 A1 * | 11/2007 | Boult et al. | | 382/119 |
| 2008/0260214 A1 * | 10/2008 | Hauke et al. | | 382/124 |
| 2009/0080709 A1 * | 3/2009 | Rowe et al. | | 382/115 |
| 2009/0103788 A1 * | 4/2009 | Maase | | 382/124 |
| 2009/0123040 A1 * | 5/2009 | Tatara | | 382/125 |

FOREIGN PATENT DOCUMENTS

| | | |
|---|---|---|
| EP | 1 612 717 A | 1/2006 |
| JP | 2007 310429 A | 11/2007 |
| WO | WO 2007/050776 A | 5/2007 |

* cited by examiner

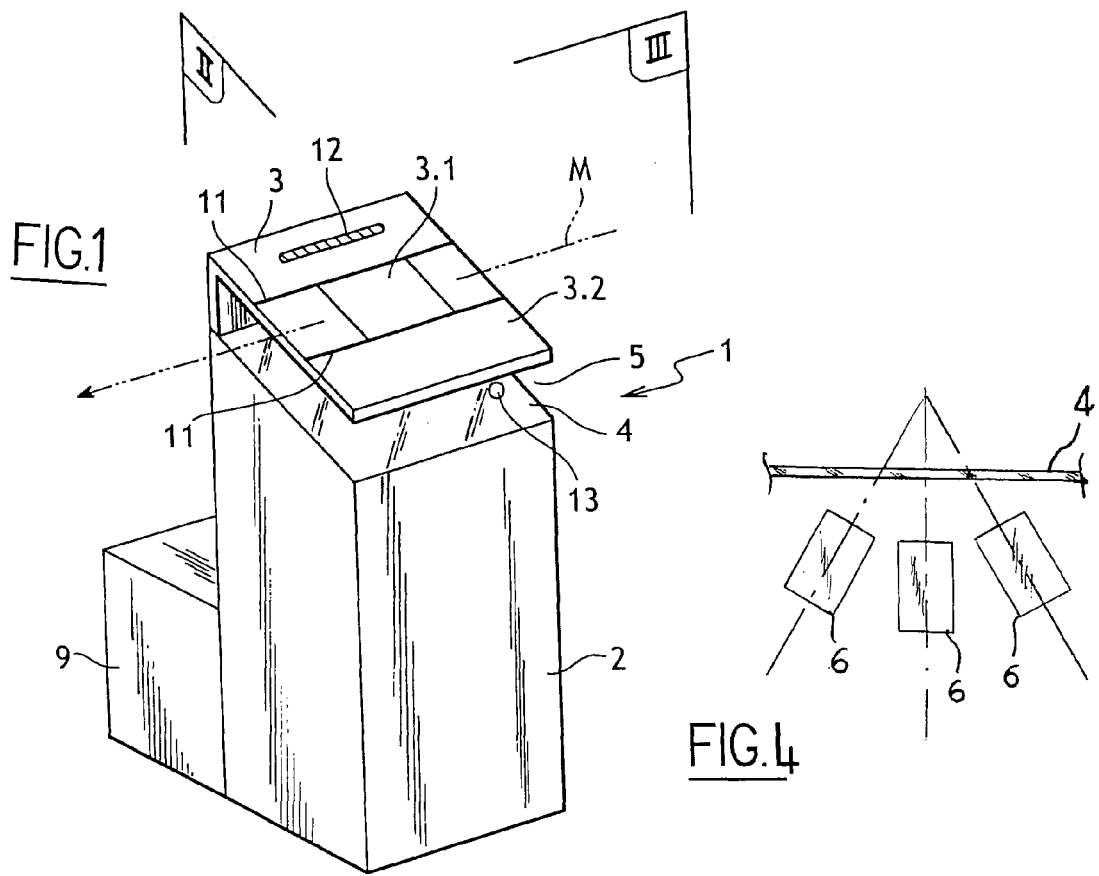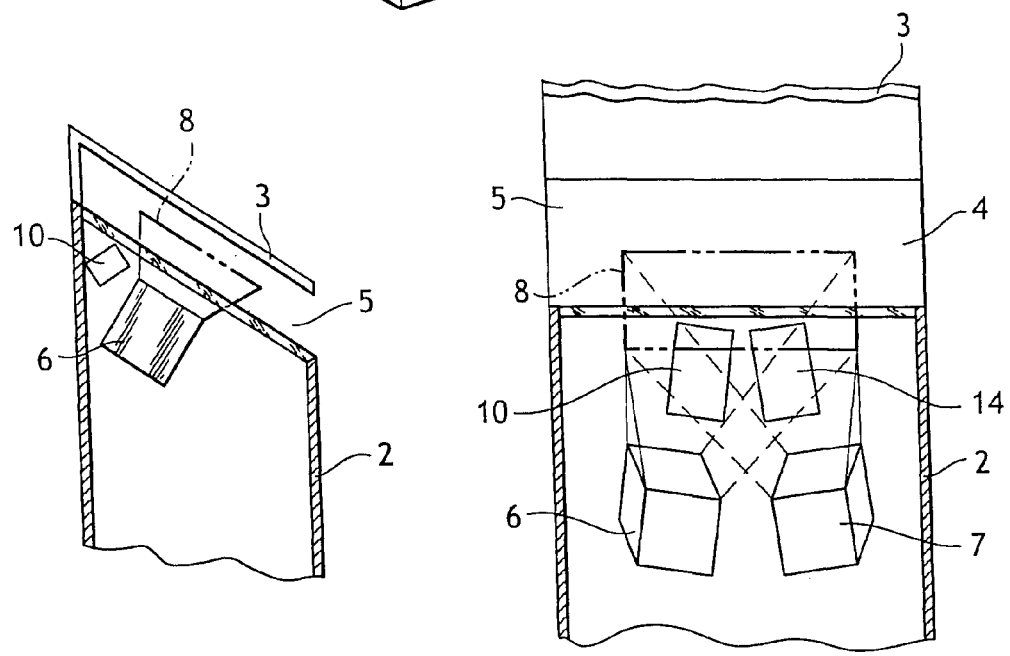

DEVICE FOR ACQUIRING IMAGES OF PATTERNS FORMED BY FURROWS IN THE SKIN OF FINGERS OR THE PALM OF THE HAND

The present invention relates to a device for acquiring images of patterns formed by furrows in the skin of the fingers or the palm of a hand (commonly fingerprints or palm prints).

BACKGROUND OF THE INVENTION

Identification by fingerprints includes a stage of acquiring an image of at least one fingerprint of a candidate for identification and a stage of processing the image to enable it to be compared with digitized fingerprint images, or with representations of such fingerprints that have been processed to show up the characteristics thereof (representations known as templates), stored in a database together with the identify of the proprietor of each of them.

Identification techniques using fingerprints are in widespread use in the context of police investigations, and they are tending to become more and more widely used for frontier controls or merely for checking identities, e.g. on entering premises to which access is regulated, such as airports, businesses, . . . .

This increase in the field of application of these techniques has resulted in particular in an improvement in the devices for acquiring fingerprint images and in the image processing systems that are associated therewith; there has also been a reduction in the cost of the computer means needed to implement them.

In these new applications, acquisition devices are used by people untrained in their use and without help from a qualified operator. In addition, in certain applications such as frontier controls a rejection can be very penalizing and can require verification by a specialized person, thereby increasing the duration of the control. The ergonomics of the acquisition device therefore need to be particularly well thought out in order to avoid wrong utilization. To improve the reliability of the verification, it has also been envisaged to perform identification on the basis of a plurality of fingerprints.

The improvement in processing methods combined with the increase in the calculation power of computer means have made it possible to reduce the time required for processing which is becoming negligible compared with the time required for acquisition, in particular when identification requires images to be acquired of a plurality of fingerprints (several different fingers).

Acquisition is generally performed by means of a device comprising a stand defining an acquisition zone that extends substantially in a plane, an acquisition member that is secured to the stand so as to have a sensing face forming the acquisition zone, and a processor unit connected to the acquisition member for processing a signal coming therefrom. The user presses a finger against the sensing face (or several fingers simultaneously or in succession, where appropriate). That mode of operation is particularly slow, and the finger must be stationary since otherwise the fingerprint cannot be acquired. Furthermore, in certain circumstances and for certain people, the skin of the fingers is particularly dry and does not enable acquisition to be performed of quality that is sufficient to guarantee good performance without waiting several tens of seconds. Finally, contact between the fingers and the sensor dirty the sensor, thereby degrading the quality of the images and thus requiring periodic cleaning, and above all being perceived by users as being unhygienic.

Systems with contact do not enable acceptable images to be acquired of palms under conditions that are ergonomic. In order to obtain an image of an entire palm, it is necessary for it to come fully into contact with the acquisition surface, and that is not generally possible and requires the hand to be flattened hard against the device.

OBJECTS AND SUMMARY OF THE INVENTION

An object of the invention is to propose acquisition means that are faster than present devices while maximizing simplicity of use.

To this end, the invention provides a device for acquiring images of a print of at least a portion of a user's hand, the device comprising a stand defining an acquisition zone extending substantially in a plane, an optical acquisition member that is fastened to the stand to have a field of view covering the acquisition zone, and a processor unit connected to the acquisition member to process an image signal coming therefrom. Wherein:

the stand is arranged to provide an empty space zone containing the acquisition zone and forming a passage for said portion of the hand while it is moving parallel to the plane;

the device includes at least one projector member for projecting a light test pattern of at least two colors into the acquisition zone;

the optical acquisition member has a depth of field extending on either side of the acquisition zone and it possesses a color sensor having an acquisition speed that is sufficient to capture at least one color image of said portion of the hand moving at a predetermined maximum speed of movement; and the processor unit is arranged to extract from the color image signal a monochrome image in each of the projected colors, to reconstitute a texture of said portion of the hand from at least one of the monochrome images, and to reconstitute a shape from at least one of the monochromic images.

This device makes it possible to perform optical acquisition without making contact with a portion of a moving hand, e.g. one or more fingers or the palm of the hand. The characteristics of the optical acquisition member ensure that sharp images are obtained of the portion of the hand moving in the vicinity of the acquisition plane (the depth of field can accommodate a certain amount of tolerance on the positioning of the portion of the hand relative so said plane). Extracting monochromatic images from the color image makes it possible to have at least two images that were taken simultaneously (the movement of the portion of the hand would make it particularly difficult to process automatically a plurality of images taken in succession), which images nevertheless possess characteristics that are different. These at least two images make it possible, by means of the processing performed by the processor unit, to obtain all of the information needed for identification (this information relating for example to local deviations in the ridges, the shape of the outlines of the ridges, the positions of pores, ridge starting points, the three-dimensional shape of the portion of the hand, . . . ). With fingers, this information can extend to the middle phalanx. This treatment also makes it possible to obtain predetermined resolution, thereby simplifying subsequent operations of comparing fingerprint images. It can thus be advantageous to calculate an unrolled image of the fingerprint at known resolution, thereby producing an image that is comparable to traditional acquisition systems, but using a larger area.

Preferably, the field of the optical acquisition member is of a width sufficient for the acquisition zone to cover a plurality of digits of one hand of a user.

It is thus possible to acquire images simultaneously showing a plurality of the user's fingers, thereby making it possible to further simplify acquisition and make processing more reliable (or more robust). The processor model can thus be arranged to extract the fingers in the series of acquired images, to segment them individually in two dimensions (2D) or in three dimensions (3D), to select the best representation of each finger in the sequence, or indeed to consolidate a set of representations for each finger. When acquiring a palm, the processor module can be arranged to enable the images to be consolidated so as to obtain the 2D representation of the entire acquired palm area and to reconstruct therefrom the entire shape thereof.

Advantageously, the projector member is secured to the stand in such a manner as to project the test pattern towards a distal end of the fingers.

The projection then encounters little or no shadow cast by a finger on a neighboring finger, where such shadows would run the risk of spoiling the image by reducing the quantity of information that can be used for identification purposes.

Advantageously, a new unrolled image is generated from the texture image and the shape of the portion of the hand, the new image representing a fingerprint image at the same resolution at all points.

This is particularly advantageous for fingers. The unrolled image is identical to the image that would be acquired with a by-rooling acquisition system (a system in which the finger is rolled on the acquisition surface to produce a complete image of the fingerprint).

In a particular embodiment, the test pattern comprises three colors, with uniform illumination in one of the three colors and with repetitive light patterns in the other two colors, and advantageously the uniform illumination is in green and the repetitive light patterns are in red and in blue.

Green illumination reveals the texture of the fingerprint in particularly effective manner. Light at wavelengths that are too long (red and infrared) is diffused to a very great extent within the finger and produces diminished contrast. Light at shorter wavelengths (blue) gives rise to problems of acquisition since cameras are less sensitive thereto. In contrast, ordinary color cameras possess more green pixels than pixels of other colors, and green is thus preferred for revealing the high frequency information of the fingerprint. The repetitive pattern is of a period that is much greater than that of the lines in the fingerprint so as to avoid producing artifacts in the image of the fingerprints.

Preferably, the repetitive light patterns are squarewave or sinewave curves advantageously extending perpendicularly to the direction of movement and presenting a non-zero angle with the sighting axis of the acquisition system.

This embodiment is particularly robust.

According to a first particular characteristic, the stand includes a member for guiding the movement of the user's finger, which member preferably comprises a translucent screen that extends over one side of the acquisition zone opposite from the optical acquisition member and that includes at least one finger positioning reference marker, and advantageously the device may further include an element for indicating a nominal speed of movement for the hand.

The guide member helps the user to keep a finger in the acquisition zone while moving it at an appropriate speed, given the acquisition capacities of the optical acquisition member.

According to a second particular characteristic, the device includes a lighting member in the near infrared and an infrared optical acquisition member is connected to the processor unit to transmit thereto an infrared image signal, and the processor unit is arranged to extract from the infrared image signal an infrared image that shows up a venous network of the finger.

The term "near infrared" is used herein to mean wavelengths lying in the range 700 nanometers (nm) to 1000 nm. This makes it possible to detect an imitation finger being used by a fraudster to reproduce the fingerprint of another person, but in which the venous network does not correspond to that of the person whose finger has been counterfeited. In addition, the venous network can be used to confirm the result of an identification made using the fingerprint.

BRIEF DESCRIPTION OF THE DRAWING

Other characteristics and advantages appear on reading the following description of a particular, non-limiting embodiment of the invention.

Reference is made to the accompanying drawing, in which:

FIG. 1 is a diagrammatic perspective view of a device in accordance with the invention;

FIG. 2 is a diagrammatic section view on plane II of FIG. 1; and

FIG. 3 is a diagrammatic section view on plane III of FIG. 1,

FIG. 4 is a diagrammatic section view analogous to FIG. 3 of a device in accordance with a variant of the invention.

MORE DETAILED DESCRIPTION

With reference to the figures, the image acquisition device in accordance with the invention comprises a stand 1 including a console 2 surmounted by a screen 3 that extends parallel to a transparent top face 4 of the console 2. The top face 4 and the screen 3 are inclined relative to the horizontal at an angle of about 45°, so that the screen 3 is tilted towards a user facing the console 2. The top face 4 and the screen 3 are spaced apart by a distance of a few centimeters (e.g. five centimeters for acquiring fingerprints, and eight centimeters for acquiring palm prints) so as to define between them a zone of empty space 5 that is open, in this example to the front and to both sides, so as to provide a passage for a hand of the user.

The console 2 contains two optical acquisition members, namely a main optical acquisition member, here a color camera 6, and an additional acquisition member, here an infrared camera 7, both of which are mounted in the console 2 so as to have a field of view covering an acquisition zone 8 that is contained fully within the empty space zone 5. The acquisition zone 8 is here more precisely at the center of the empty space zone 5 and it has a plane parallel to the top face 4. The field of view of the cameras 6 and 7 is of a width that is sufficient to enable the acquisition zone 8 to cover several digits on the same hand of a user (here the index, middle, ring, and little fingers). The cameras 6 and 7 are adjusted to have a field of view with a depth that extends on both sides of the acquisition zone 8. Each camera 6 and 7 has a sensor with an acquisition speed that is fast enough to take an image of a hand moving through the acquisition zone at some maximum predetermined speed of movement. By way of example, the sensor used is a sensor having 1.3 million pixels and a speed lying in the range 60 to 100 images per second.

The cameras 6 and 7 are connected to a processor unit 9 to transmit thereto signals constituting a color image and signals constituting an infrared image, respectively. The processor unit 9 is implemented here as a computer executing an image-processing program.

The stand 1 also contains a projector member 10 for projecting a light test pattern in three colors. The projector member 10 is secured to the stand below the passage through the fingers pass and it is directed towards the acquisition zone 8, here covering the front of the fingers where print information is the most discriminating. The pattern comprises uniform illumination in one of the three colors, here in green, together with repetitive light patterns in the other two colors, here squarewave or sinewave curves in red and blue extending perpendicularly to the direction in which the hand moves. The test pattern is here defined to have a mean period on a finger of 70 to 80 pixels at 750 dots per inch (dpi).

The stand 1 also contains a projector member 14 for projecting a light beam in the near infrared, and disposed in the example described herein in a manner that is analogous to the projector member 10.

The screen 3 has a central portion 3.1 that is translucent and highly diffusing in the acquisition zone 8, and a peripheral portion 3.2 that is transparent. The central portion 3.1 may advantageously be provided firstly with a contrast plate (glass of neutral density with antireflection treatment) at its top face, and secondly with a blue filter together with antireflection treatment on its bottom face. Lines 11 parallel to the desired direction of hand movement are drawn on the screen 3 to inform the user how to position a hand. In addition, the screen 3 is provided with an indicator element 12 for indicating a desired speed of movement. The indicator element 12 is here a string of moving lights comprising light-emitting diodes (LEDs) disposed in a line parallel to the lines 11 and programmed to light the LEDs up in succession at the desired speed.

The operation of the device is described below.

A user seeking to be identified (or authenticated) puts a hand into the empty space zone 5 through one side thereof and, while keeping that hand between the reference lines 11, moves it to the other side, while matching the speed indication optionally given by the indicator element 12 (the direction of movement is referenced M in FIG. 1, with movement in the opposite direction also being accepted).

A sensor 13, here an infrared barrier, detects entry of the hand into the acquisition zone 8 and causes the projector member 10 and the cameras 6 and 7 to be activated. A second sensor may be disposed on the other side of the stand so as to enable the hand to be passed equally well in either direction. Because of the position of the projector member 10, the test pattern is projected towards the ends of the fingers so as to avoid the fingers creating shadows on one another.

The screen 3 and the light projection members are arranged in such a manner that the screen 3 intercepts all of the light that is projected, and prevents the user from seeing the projected light directly. The user sees only the light diffused by the screen 3, which screen has absorption characteristics that are selected so as to produce an image that is clearly visible and not dazzling. When required, a small opaque frame may be added between the central zone and the peripheral zone.

The cameras 6, 7 then transmit image signals to the processor unit 9.

The program executed by the processor unit 9 is adapted to extract from the color image signal transmitted by the camera 6 a monochrome image in each of the three projected colors (green, red, and blue), to reconstitute a texture for each finger on the basis of at least one of the monochrome images (specifically here from the green image), and to reconstitute a shape for each finger from at least one other one of the monochrome images (i.e. here the red image and the blue image). Each finger or palm is reconstituted in this way and it is possible to extract therefrom an image at a resolution adapted to the comparisons that are performed subsequently with fingerprints stored in the database used for identification. These adapted images are obtained by overall scaling of one or more of the acquired images or by consolidating them and/or they come from being put back into the plane of the skin texture on the basis of three-dimensional information derived from the images as acquired or consolidated. Other flattening methods are known, such as that described in the article "3D *touchless fingerprint compatibility with legacy rolled images*", by Y. Chen et al. in *Biometric Consortium Conference*, Aug. 21, 2006, pp. 1-6. This comparison stage is performed in conventional manner and is not described in detail herein. It can make use of one of the two methods of re-setting resolution, or both methods simultaneously.

The infrared image signal transmitted by the camera serves to make an image of the venous network. This image is used for verifying that imitation fingers are not being used (there would then not be an image including a venous network) and, once the user has been identified on the basis of the fingerprint, the image is also used to verifying that the venous networks of the owner's fingers as recorded in the database are indeed the same as those of the fingers of the user, thereby reinforcing the reliability of identification by adding an additional verification (without slowing identification down significantly).

If it is also necessary to have an image of the thumb, the user is invited to place the thumb in the acquisition zone in the same manner as just performed for the other digits. The processing is identical.

Naturally, the invention is not limited to the embodiment described but covers any variant coming within the ambit of the invention as defined by the claims.

In particular, the structure of the device of the invention, and in particular the shape of the stand, can be different from that described. The empty space zone might be open to the front only, with the user advancing and then withdrawing a hand for acquisition purposes. The device may include guide means other than the screen 3, and for example sound-emitting means.

The number and wavelength of the light beams projected to form the test pattern may be other than those described. Two light beams of different colors can thus be used instead of the three in the embodiment described. One of the repetitive patterns can serve as a positioning reference of the other repetitive pattern, the repetitive patterns having frequencies that may be identical or different. When only one repetitive pattern is used for the test pattern, the test pattern advantageously includes a particular element—a broader line, a sudden change of phase, or of frequency—enabling the processor unit to identify each line in the image in order to facilitate shape reconstruction. The use of two color patterns can enable particular features to be found in the image (using a very low frequency such that two periods cannot be confused, given the volume of the acquisition; making use of the phase difference between the two images; . . . ). A light beam of a single color can be arranged to contain in part a zone that is uniform, making it possible to obtain the texture, and in part a zone that contains a repetitive pattern. One or more other light beams may have zones of the same type in complementary manner, thereby enabling a repetitive pattern and uniform lighting to be reconstituted over the entire illuminated surface. The projected system may have one or two projection channels, separating the uniform lighting means in green of the projector means from the repetitive patterns in red and blue.

One or more additional lighting sources may be added to the projector system in order to light the sides and the tips of the fingers.

The speed indicator element is optional.

The cameras and the projector member can be activated by pressing on a control button.

The infrared camera and its illumination system are optional. Under all circumstances, since the infrared information is not preponderant in the system, the main acquisition system is maintained on the axis for conserving the best possible image quality for the main acquisition system.

In a variant, the device comprises at least a second optical acquisition member, the optical acquisition member being positioned for increasing the area of the hand that is imaged. More precisely, additional cameras for increasing the area that is imaged (on the sides of the finger) may be added to improve the quality of the fingerprints reconstructed for the sides of the finger, and to approach the quality of images acquired on police acquisition systems that operate by rolling the finger on the acquisition surface. With reference to FIG. 4, the device thus comprises three cameras 6: one central camera is disposed between two lateral cameras and has its optical axis aligned with a vertical axis. The lateral cameras have their optical axis aligned with axis forming with the vertical axis an angle inferior to about 45°, here an angle of about 30°. The images produced by each camera overlap the images produced by at least one of the other cameras in order to allow a reconstruction of a more important area of the fingerprints. During the reconstruction, the images are positioned relatively to each other using similarities measurements such as correlations. 3D models can also be used and positioned relatively to each other by minimizing distances between surfaces of the models. Such reconstruction methods are known per se.

The projector member may operate continuously or using flashes synchronized with the sensors of the cameras. The use of flashes can be advantageous when improving the acquisition of images of fingers that are moving quickly and can enable the depth of field of the imaging system to be increased and thus the acquisition volume to be increased.

Advantageously, the image processor unit is arranged to perform a step of segmenting the fingers, of tracking the fingers from one image to another, of selecting the best images or image portions for each finger, optionally of consolidating selected images or image portions of each finger in two or three dimensions, preprocessing adapted to making comparisons with the database, and improving the images.

The system may thus perform the following tasks:
waiting for the camera to be triggered (typically by infrared presence detection), or acquiring images in a continuous loop;
for each image, segmenting the fingers in the image (in 2D or in 3D);
tracking the segmented shapes from image to image for each finger, and selecting the best images for each finger (in 2D or in 3D);
if the fingers have stopped going past, stopping image acquisition;
once the fingers have stopped going past, if several images have been detected for a particular finger, consolidating images in 2D or 3D;
preparing a final image for each finger, with re-scaling; and
making use of the image as prepared in this way for identification purposes.

Three-dimensional information (finger shape) need be calculated only when required, for reasons of performance. Thus, the segmentation processing and the finger tracking processing can be performed in real time while making relatively little use of processor resources.

In practice, the system can be adjusted so as to be capable of acquiring images of a hand that is moving very fast (more than one meter per second), so as to avoid any need to inform the user of the optimum speed for passing a hand.

In a variant, the system may use a device for providing uniform illumination in one color, and member for projecting a test pattern in one or more other colors.

What is claimed is:

1. A device for acquiring images of a print of at least a portion of a user's hand, the device comprising a stand defining an acquisition zone extending substantially in a plane, an optical acquisition member that is fastened to the stand to have a field of view covering the acquisition zone, and a processor unit connected to the acquisition member to process an image signal coming therefrom, wherein:
   the stand is arranged to provide an empty space zone containing the acquisition zone and forming a passage for said portion of the hand while it is moving parallel to the plane;
   the device includes at least one projector member for projecting a light test pattern of at least two colors into the acquisition zone;
   the optical acquisition member has a depth of field extending on either side of the acquisition zone and it possesses a color sensor having an acquisition speed that is sufficient to capture at least one color image of said portion of the hand moving at a predetermined maximum speed of movement; and
   the processor unit is arranged to extract from the color image signal a monochrome image in each of the projected colors, to reconstitute a texture of said portion of the hand from at least one of the monochrome images, and to reconstitute a shape from at least one of the monochromic images.

2. A device according to claim 1, in which the field of the optical acquisition member is of a width sufficient for the acquisition zone to cover a plurality of digits of one hand of a user.

3. A device according to claim 1, in which the projector member(s) is/are fastened to the stand in such a manner as to project the test pattern towards a distal end of the fingers.

4. A device according to claim 1, in which the test pattern comprises uniform lighting in one of the colors and repetitive light patterns in one or more other colors.

5. A device according to claim 1, in which the system uses a uniform lighting device in one color and a projector member for projecting a test pattern in one or more other colors.

6. A device according to claim 4, in which the uniform lighting is in green and the repetitive light patterns are in red and in blue.

7. A device according to claim 4, in which the repetitive light patterns are squarewave or sinewave curves.

8. A device according to claim 4, in which the squarewave or sinewave curves extend perpendicularly to the direction of movement and present a non-zero angle with the sighting axis of the acquisition systems.

9. A device according to claim 1, in which the stand includes a member for guiding the movement of the user's finger.

10. A device according to claim 9, in which the guide member comprises translucent screen that extends over one side of the acquisition zone remote from the optical acquisition member, and that includes at least one finger positioning mark.

11. A device according to claim 9, in which the guide member is provided with an element for indicating a predetermined speed of movement.

12. A device according to claim 1, including a lighting member in the near infrared and an infrared optical acquisition member connected to the processor unit to transmit thereto an infrared image signal, and the processor unit is arranged to extract from the infrared image signal an infrared image revealing a venous network of the finger.

13. A device according to claim 1, in which the plane of the acquisition zone is inclined relative to the horizontal.

14. A device according to claim 1, in which the processor unit is arranged to generate from the texture and the shape of the portion of the hand a rolled-out image representing the image of a fingerprint having the same resolution at all points.

15. A device according to claim 1, comprising at least a second optical acquisition member, the optical acquisition member being positioned for increasing the area of the hand that is imaged.

16. A device according to claim 15, wherein the optical acquisition members have optical axis forming an angle less than 45° approximately.

* * * * *